United States Patent [19]
Reynolds

[11] Patent Number: 5,950,523
[45] Date of Patent: Sep. 14, 1999

[54] COMPOSITE DIAPHRAGM HAVING TWO LAYERS WHEREIN THE FIRST LAYER IS CHEMICALLY RESISTANT AND OF REDUCED THICKNESS IN THE AREA OF FLEX OF THE BODY

[75] Inventor: Steven M. Reynolds, Lucas, Ohio

[73] Assignee: Warren Rupp, Inc., Mansfield, Ohio

[21] Appl. No.: 08/987,239

[22] Filed: Dec. 9, 1997

[51] Int. Cl.⁶ .................................................. F01B 19/00
[52] U.S. Cl. ...................... 92/98 R; 92/103 R; 92/103 F; 92/103 SD
[58] Field of Search ............................ 92/93, 98 D, 98 R, 92/103 R, 103 F, 103 SD; 29/888.02

[56] References Cited

U.S. PATENT DOCUMENTS

| | | | |
|---|---|---|---|
| 2,460,168 | 1/1949 | Caserta | 92/103 F |
| 2,730,131 | 1/1956 | Asp et al. | 92/103 SD |
| 4,741,252 | 5/1988 | Harter et al. | 92/98 D |
| 4,864,918 | 9/1989 | Martin | 92/103 R |
| 5,165,869 | 11/1992 | Reynolds . | |
| 5,217,797 | 6/1993 | Knox et al. | 92/103 SD |
| 5,349,896 | 9/1994 | Delaney, III et al. . | |
| 5,634,391 | 6/1997 | Eady | 92/98 R |

FOREIGN PATENT DOCUMENTS

WO 97/36092  10/1997  WIPO .

Primary Examiner—Thomas E. Denion
Attorney, Agent, or Firm—Hill & Simpson

[57] ABSTRACT

A composite flexible diaphragm for a diaphragm pump. The diaphragm has a diaphragm body with an outer perimeter, a center axis, and first and second exterior surfaces. The body has a perimeter flange portion extending around the body adjacent the outer perimeter. The body also has a disc portion extending radially outward from the center axis. The body has a convoluted flex portion disposed between the perimeter flange portion and the disc portion. The composite flexible diaphragm has a first layer of a chemically resistant material defining the first exterior surface. The diaphragm also has a second layer of flexible material which is bonded to the first layer and defines the second exterior surface of the diaphragm. The first layer of chemically resistant material has a reduced material thickness in the area of the flex portion of the diaphragm body.

35 Claims, 3 Drawing Sheets

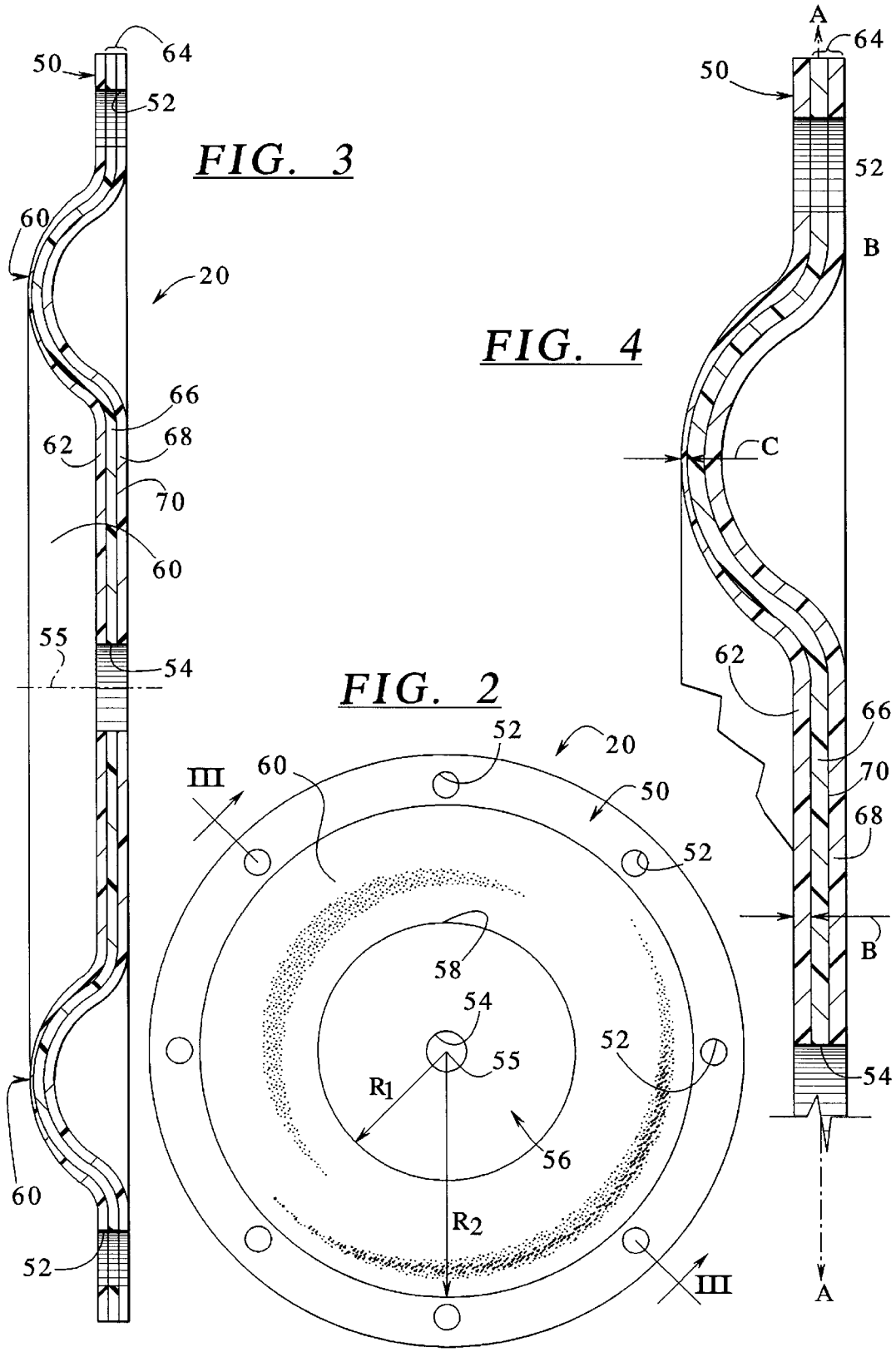

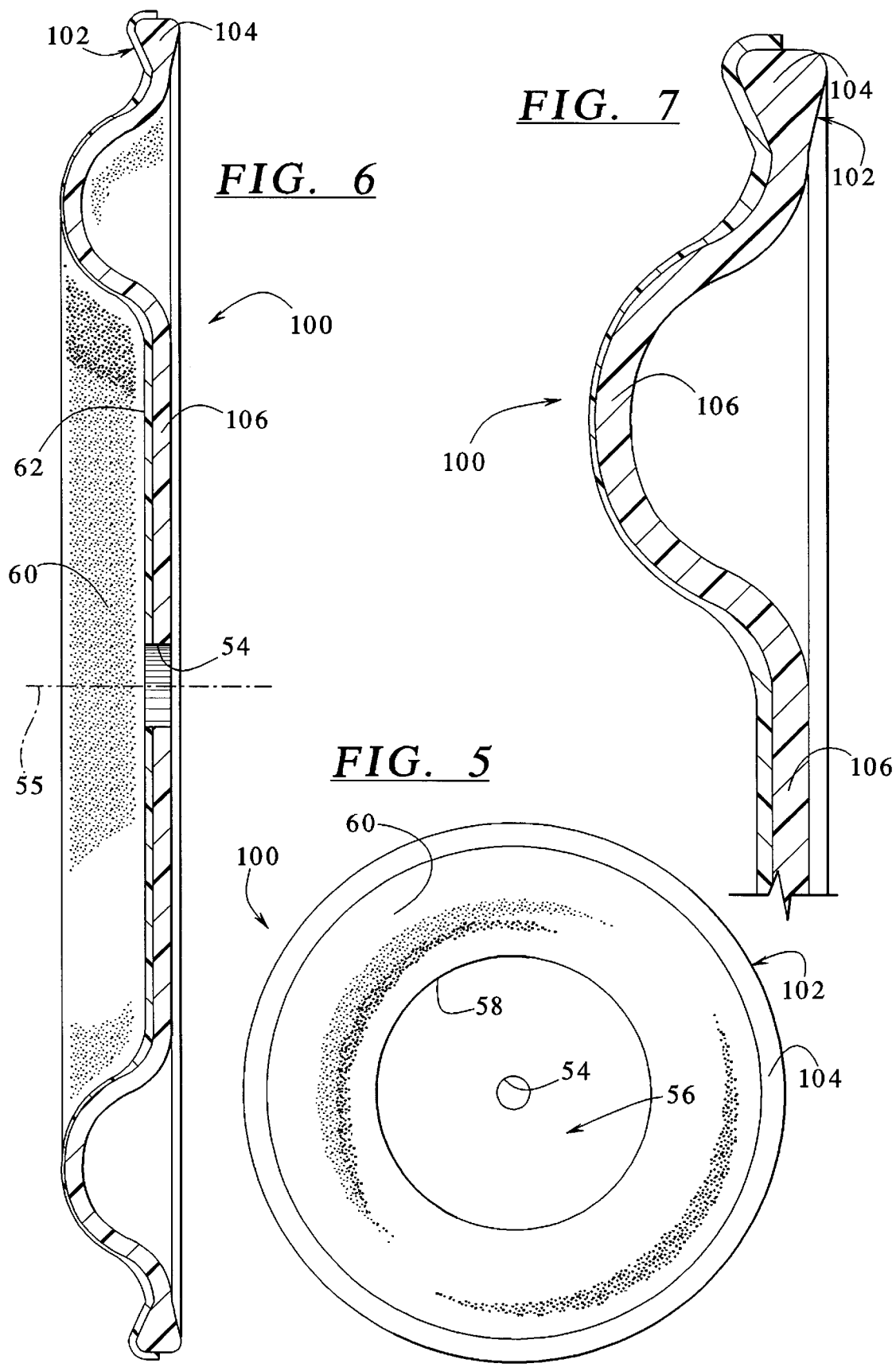

COMPOSITE DIAPHRAGM HAVING TWO LAYERS WHEREIN THE FIRST LAYER IS CHEMICALLY RESISTANT AND OF REDUCED THICKNESS IN THE AREA OF FLEX OF THE BODY

TECHNICAL FIELD

The invention is directed to diaphragm pumps generally, and more particularly, to a composite diaphragm for such a pump.

BACKGROUND OF THE INVENTION

The use of diaphragms in fluid pumps is well known. Diaphragm pumps offer several advantages over conventional piston pumps, among which are a resistance to leakage and a decreased number of parts required. In such pumps, the diaphragms are not driven directly, but are driven through a pressure medium or "drive fluid", which is contained within a drive chamber. A typical drive fluid is air which is used to cycle the diaphragm back and forth. The diaphragm forms a boundary between the drive chamber and a pump chamber which contains the fluid to be pumped. One disadvantage of known diaphragm pumps is the risk of contamination of the pump fluid by leaking drive fluid. If the diaphragm seal is defective or develops a leak due to wear of the diaphragm material, drive fluid may escape to the pump chamber, where it may commingle with and contaminate the fluid to be pumped. Such contamination is particularly undesirable in applications where the purity of the pumped fluid is critical. Another disadvantage is a significant reduction in pump efficiency if drive fluid pressure in the drive chamber is continually lost because of a diaphragm leak.

Attempts have been made to produce highly durable and wear resistant diaphragms for such pump applications. Conventional single material diaphragms made out of material such as elastomer are highly flexible and resilient providing excellent pumping characteristics, but are not exceptionally durable.

Fabric reinforcement has been added to elastomer material such as Neoprene in attempting to increase the durability or wear characteristics of the diaphragm. This has been proved to be insufficient for many applications wherein the fluid to be pumped requires that the diaphragm be resistant to chemical degradation and surface abrasion and yet remain flexible and durable. Such known diaphragms are relatively flexible and strong and provide some abrasion resistance but are not chemically resistant to many materials or fluids. An example of such a fabric reinforced diaphragm is disclosed in International Patent Publication No. W097/36092 which is assigned to Wilden Pump & Engineering Co.

The assignee of the present invention has previously developed the use of back-up type diaphragms having an elastomer support diaphragm and a diaphragm with fluorocarbon (such as TEFLON®) as a pump overlay in air operated double diaphragm pumps. Such a diaphragm has an elastomeric diaphragm and a fluorocarbon diaphragm overlay placed on but not bonded to the side facing the fluid to be pumped. The support diaphragm is subjected to a bulk of the stress from the cyclic operation of the diaphragm and the fluorocarbon overlay provides the chemical resistance. An additional example of this type of layered diaphragm is disclosed in U.S. Pat. No. 5,349,896 which is assigned to W.L. Gore & Associates, Inc. The '896 patent additionally discloses bonding the two layers together.

One problem with the overlay diaphragm construction is that the TEFLON overlay material is not particularly strong, flexible or abrasion resistant. To make the TEFLON material more abrasion resistant the material must be thickened to compensate for these shortcomings. By making the material thicker, it exacerbates another problem with fluorocarbon materials in that they are not very flexible in their natural state. Thus, a fluorocarbon overlay over an elastomeric diaphragm which is adequately abrasion resistant is not very flexible and hence not very durable during cyclic operation. A thinner walled TEFLON overlay may provide at best adequate durability during flex of the diaphragm but does not provide adequate abrasion resistance to the fluids within the pump.

Another problem with the TEFLON overlay material is that it is not sufficiently strong. When a TEFLON material is subjected to repeated flexing or stress, it has insufficient elasticity or elastic memory so that when the stress is released it does not return completely to its original shape. Therefore, as the TEFLON overlay is stressed it becomes thinner over time further reducing its abrasion resistance and strength.

SUMMARY OF THE INVENTION

It is therefore an object of the present invention to provide a diaphragm that reduces or eliminates the above described disadvantages and yet retains all of the benefits of safety, serviceability and durability that make diaphragm pump arrangements desirable.

It is another object of the present invention to provide a pump diaphragm with improved chemical resistance characteristics in order that the diaphragm does not degrade over time due to continuous exposure to incompatible pump fluids.

It is another object of the present invention to provide a pump diaphragm which is significantly resistant to abrasion caused by the fluids pumped during operation of the diaphragm pump.

It is another object of the present invention to provide a pump diaphragm which is also sufficiently flexible for long life and durability during continuous cyclic flexing as the pump operates.

To attain the foregoing objects, the present invention overcomes the disadvantages of known pump diaphragms by providing a composite diaphragm of a novel construction.

In one embodiment, the diaphragm has a diaphragm body with an outer perimeter, a center axis, and a first and second exterior surface. A perimeter flange portion of the body extends around the body adjacent the outer perimeter. A disc portion of the body extends radially outward from the center axis. The body also has a convoluted flex portion disposed between the perimeter flange portion and the disc portion of the diaphragm. The first exterior surface is defined by a chemically resistant first layer of material. The second exterior surface is defined by a flexible second layer of material bonded to the first layer forming the diaphragm body. The first layer of material has a reduced thickness in the area of the flex portion of the body.

In one embodiment, the second layer of material is an elastomer material such as neoprene rubber.

In one embodiment, the second layer of material includes a fabric reinforcement layer formed from a strong and flexible material such as nylon fabric embedded within the elastomer material.

In one embodiment, the first and second layers of the diaphragm are permanently bonded to one another by an adhesive.

In one embodiment, the first layer has a thickness of about 0.050 inches or greater over most of the first layer and has a reduced thickness in the area of the flex portion of the body about between 0.020 and 0.040 inches.

In one embodiment, the first layer of material is a fluorocarbon material such as polytetrafluoroethylene or TEFLON®.

In one embodiment, the composite diaphragm includes a number of openings formed through the perimeter flange for mounting the diaphragm to a pump. In another embodiment the composite diaphragm includes an enlarged cross section or V-shaped band formed on the perimeter flange adjacent the outer perimeter for mounting the diaphragm to a pump.

In one embodiment of the invention, a diaphragm pump has a fluid inlet, a fluid discharge, and at least one diaphragm for pumping a fluid from the inlet to the discharge. The pump incorporates a composite diaphragm as described above. In another embodiment, the diaphragm pump incorporates a pair of diaphragms constructed according to the present invention.

In another embodiment, a method of fabricating a composite diaphragm is disclosed. The method includes molding a layer of flexible material having a perimeter flange portion, a center axis, a disc portion extending radially outward from the center axis, and a convoluted flex portion between the perimeter flange portion and the disc portion. The method also includes fabricating a layer of chemically resistant material which also has the same structural features as the molded layer of flexible material. The flexible material layer is placed adjacent the chemically resistant layer of material so that the respective center axes, convoluted flex portions, and perimeter flange portions align with one another. The layers are permanently bonded to one another forming the composite diaphragm.

In one embodiment, the method includes molding a flexible layer from a material such as elastomer.

In one embodiment, the method includes providing a fabric reinforcement layer from a material such as nylon fabric and molding the flexible layer over the fabric reinforcement layer.

In one embodiment, the method includes applying an adhesive to at least one of the flexible and the chemically resistant layers before the step of placing the layers adjacent one another for permanently bonding them.

In one embodiment, the method includes the step of fabricating the chemically resistant layer from a fluorocarbon material such as a polytetrafluoroethylene material or more particularly TEFLON®.

Other objects, features and advantages of the present invention will become apparent upon reference to the accompanying detailed description and the following drawings.

BRIEF DESCRIPTION OF THE DRAWINGS

FIG. 2 illustrates a front plan view of a composite diaphragm constructed in accordance with one embodiment of the present invention.

FIG. 3 illustrates a cross-section taken along line III—III of the composite diaphragm of FIG. 2.

FIG. 4 illustrates an enlarged view of a portion of the diaphragm cross-section of FIG. 3.

FIG. 5 illustrates a front plan view of another embodiment of a composite diaphragm constructed in accordance with the invention.

FIG. 6 illustrates a cross-sectional view taken along line VI—VI of the composite diagram of FIG. 5.

FIG. 7 illustrates an enlarged view of a portion of the diaphragm cross-section of FIG. 6.

DETAILED DESCRIPTION OF THE PREFERRED EMBODIMENTS

Figure 1:
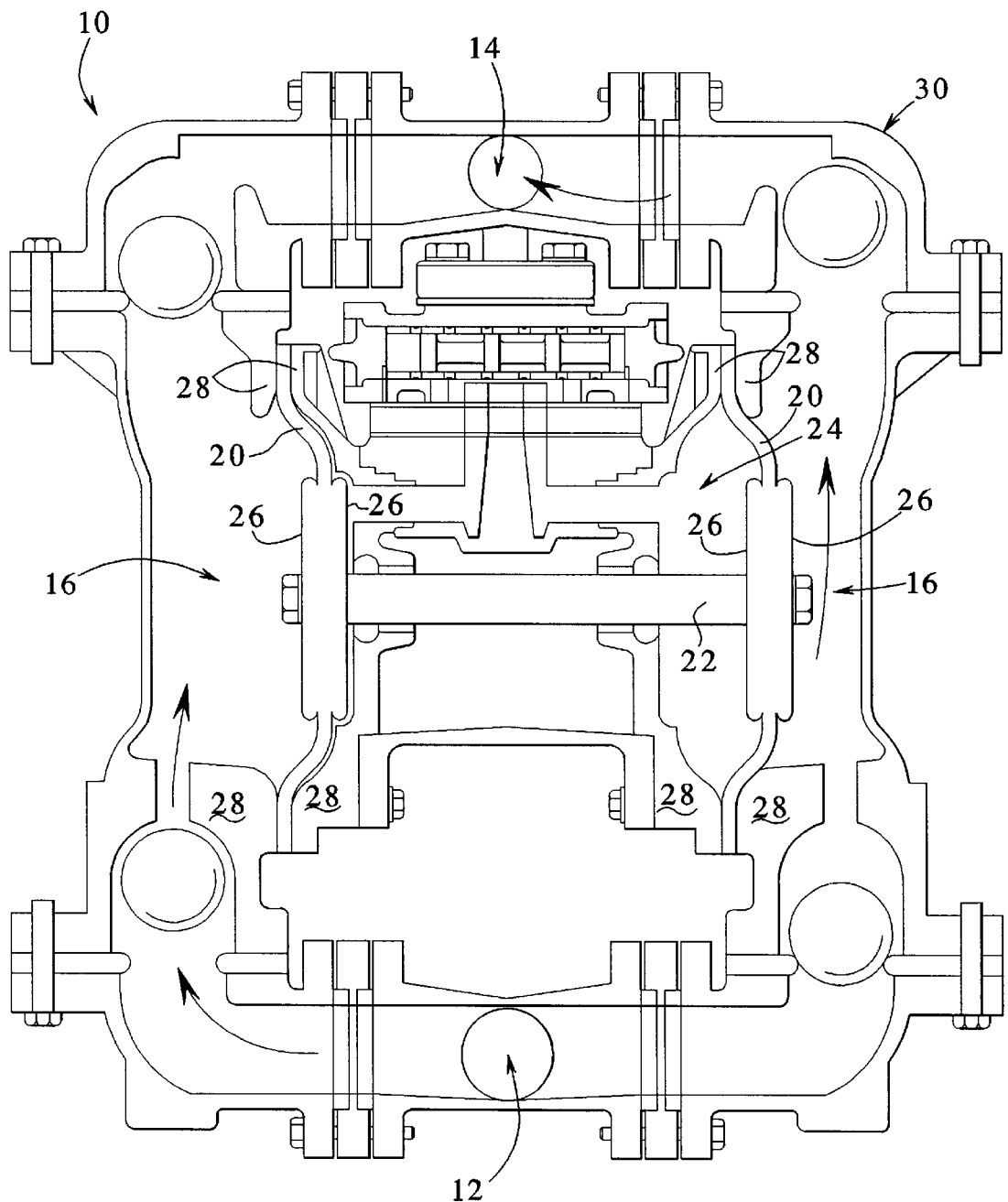
FIG. 1 illustrates a cross-section through a conventional diaphragm pump for which the composite diaphragm of the invention is intended.

FIG. 1 illustrates a conventional double diaphragm type pump for which the present composite diaphragm of the invention is intended. The diaphragm pump 10 includes an inlet 12 into which the fluid to be pumped enters the pump. The pump 10 also includes a discharge 14 through which the fluid to be pumped exits the pump. The pump 10 of FIG. 1 includes a pair of flexible diaphragms 20 connected by a diaphragm rod 22 which interconnects the two diaphragms and reciprocates them simultaneously. Each diaphragm 20 faces a fluid passage 16 on one side and faces an interior chamber 24 on its other side. The interior chamber communicates with a separate drive fluid such as air which cyclically enters alternately into one of the chambers 24, for one of the diaphragms, then the other, for reciprocating them. The reciprocating motion of the dual diaphragms moves the fluid from the inlet 12, through the fluid passages 16, to the discharge 14 of the pump 10.

Each diaphragm 20 is sandwiched between a pair of plates or washers 26 near the center axis for moving the diaphragm in conjunction with the diaphragm rod 22. The outer perimeter of each diaphragm is securely held between two portions 28 of a pump housing 30 for securely supporting the diaphragms relative to the housing and further for providing a fluid tight seal between each of the chambers 24 and the fluid passages of the pump.

One of the composite diaphragms 20 is illustrated at FIG. 2. The diaphragm 20 has a generally circular body shape when viewed from the front or back as illustrated in FIG. 2. In viewing the diaphragm in cross section as in FIG. 3, the diaphragm 20 has a perimeter annular flange 50 and a plurality of openings 52 formed through the flange spaced apart around the perimeter of the diaphragm. The flange 50 and openings 52 are utilized in the present embodiment for mounting the diaphragm 20 to the pump 10 or being sandwiched between two portions 28 of the pump 10 as shown in FIG. 1. The openings 52 may be used to fasten the diaphragm 20 to the pump 10 or merely to properly align the diaphragm.

The diaphragm 20 also has an axial opening 54 disposed at a center axis 55 of the diaphragm. The axial opening 54 is intended for attachment of the diaphragm 20 to the diaphragm rod 22. Extending radially outward from the center axis 55 of the axial opening 54 to a radius $R_1$, the diaphragm 20 includes a generally planar disc portion 56. The disc portion 56 is essentially planar in this embodiment for sealingly mating with the washers 26 of the diaphragm rod 22. The disc portion 56 terminates generally at an outer perimeter 58 defined at the radius $R_1$.

An annular bulge or convoluted flex portion 60 is disposed between the planar disc portion 56 and the perimeter annular flange 50 extending outward from the outer perimeter 58 of the disc portion 56 to a radius $R_2$. As best illustrated in FIGS. 3 and 4, the convoluted flex portion 60 extends outward in one direction from a plane "A" defined by the planar disc portion 56 and the annular flange 50. The flex portion 60 provides the inherent flexibility of the diaphragm 20 as is known in the art. Those skilled in the art will realize that the flex portion 60 may take on other configurations and orientations without departing from the scope of the present invention.

As best illustrated in the cross-section of FIGS. 3 and 4, the composite diaphragm 20 is comprised of multiple layers of material including a first layer 62 and a second combination layer 64. The first layer 62 is disposed on the side of the diaphragm 20 having the convex portion of the convolution 60. The second combination layer 64 is disposed on the opposite side of the diaphragm 20 having the concave portion of the convolution 60.

In this embodiment, the second combination layer 64 includes two sub-layers 66 and 68 formed of an elastomer material. The sub-layers 66 and 68 in this embodiment sandwich fabric reinforcement layer 70 therebetween. The elastomer material is typically molded directly over the fabric layer 70 of the second combination layer 64 during forming the two sub-layers 66 and 68 as one. The fabric layer 70 may be made from any number of different fabric materials such as a suitable nylon mesh, but preferably a fabric is selected that adds significant strength to the elastomer material of the second combination layer 64 without affecting or reducing the flexibility of the diaphragm 20.

As best illustrated in FIG. 4, the first layer 62 includes a first thickness "B" in the area of the planar portions of the diaphragm 20 and particularly in the area of the perimeter flange 50 and the planar disk portion 56. The first layer 62 also includes a second thickness "C" in the area of the convolution 60 which is less than the first thickness "B". The transitions between the flex portion 60 and both the disc portion 56 and perimeter flange 50 is preferably also the transition between the thicknesses "B" and "C".

In the embodiment illustrated in FIG. 2, the first layer 62 is preferably formed from a chemically resistant material such as fluorocarbon, more particularly a polytetrafluoroethylene, or one commonly known as TEFLON®. TEFLON® provides excellent chemical resistance characteristics but is not particularly flexible. The reduced thickness area "C" over the flex portion 60 permits the diaphragm 20 to have a chemically resistant film over the entire area of the diaphragm and yet flex sufficiently in the area of the flex portion 60 during cyclic operation of the pump. The thickness "C" of the first layer 62 in the area of the flex portion 60 is preferably thin enough so that as the diaphragm 20 flexes or cycles back and forth, the flex areas of the first layer 62 are not stressed beyond their point of elastic memory. In the present embodiment, the composite diaphragm 20 is formed by producing the second combination layer 64 and the first layer 62 separate from one another and then permanently bonding the two layers together. Conventional adhesive materials or other known processes may be used and applied to one or both layers in order to physically bond the first and second layers 62 and 64 together when place adjacent one other.

The chemically resistant layer 62 is preferably formed so that the material is thinner only in the areas of highest flex. These thicknesses "B" and "C" may be optimized through testing and analysis for a particular diaphragm application. If a TEFLON® material were used alone as the diaphragm material, its flex life would be short. Thus, by providing the second combination layer 64 bonded to the first TEFLON® layer 62, the strength and wear characteristics of the fluorocarbon are significantly increased. Similarly, if the elastomer combination layer 64 including the fabric reinforcement 70 were utilized without the TEFLON® layer 62, the diaphragm 20 would not be suitable for all pump fluid applications. The elastomer material is destroyed or degraded by many chemically caustic materials for which this type of pump may be used. Thus, the TEFLON® coating provides the chemical wear resistance for the diaphragm 20.

As will be evident to those skilled in the art, the composite diaphragm 20 of FIGS. 2–4 may be fabricated from materials other than those disclosed for the first and second layers 62 and 64. Similarly, the bonding process for adhering the two layers together may also differ from that disclosed without departing from the scope of the present invention.

FIGS. 5–7 illustrate an alternative embodiment for a composite diaphragm 100 wherein like numerals refer to like components between the two embodiments. Essentially the only difference between this diaphragm 100 and that of the prior embodiment is in the perimeter flange area of the diaphragm. In the prior embodiment, the perimeter flange 50 provided openings 52 for attaching, mounting or aligning the diaphragm 20 to a diaphragm pump 10. In the present embodiment, the diaphragm 100 includes an annular flange 102 having an enlarged cross-section at its outermost edge, defining what is known in the art as a V-band 104. The enlarged cross-sectional area or V-band 104 is typically sandwiched between two housing components of a pump housing similar to pump 10 of FIG. 1 but received within a V-shaped groove for securely and sealingly holding the diaphragm 100 in place.

The elastomeric second combination layer 64 in the prior embodiment has been replaced by a single second layer 106 in this embodiment formed of a unitary layer of elastomer material. It includes no fabric reinforcement layer 70 as does the prior embodiment. As will be evident to those skilled in the art, the prior embodiment may also include this single element layer construction, or the embodiment of FIG. 4 may include the reinforced combination layer construction.

Although the present invention has been described with reference to specific embodiments, operating in accordance with certain physical principles, those of skill in the art will recognize that changes may be made without departing from the scope and spirit of the invention as set forth in the appended claims. Alternative embodiments are therefore contemplated as falling within the scope and spirit of the invention. The invention is therefore intended to be limited only by the appended claims.

What is claimed is:

1. A composite flexible diaphragm for a diaphragm pump, the diaphragm comprising:

a diaphragm body having an outer perimeter, a center axis, and a first and a second exterior surface;

a perimeter flange portion of the body extending around the body adjacent the outer perimeter;

a disc portion of the body extending radially outward from the center axis;

a convoluted flex portion of the body disposed between the perimeter flange portion and the disc portion;

a chemically resistant first layer of material defining the first exterior surface;

a flexible second layer of material bonded to the first layer and defining the second exterior surface; and wherein the first layer of material has a reduced material thickness in the area of the flex portion of the body.

2. The composite diaphragm according to claim 1, wherein the second layer of material is an elastomer material.

3. The composite diaphragm according to claim 2, wherein the elastomer material is a neoprene rubber.

4. The composite diaphragm according to claim 1, wherein the second layer of material further comprises:
   a fabric reinforcement material embedded therein.

5. The composite diaphragm according to claim 4, wherein the fabric reinforcement material is a nylon fabric.

6. The composite diaphragm according to claim 1, wherein the second layer of material further comprises:
   a fabric reinforcement material; and
   an elastomer material molded around the fabric reinforcement material.

7. The composite diaphragm according to claim 1, wherein the first and second layers of material are permanently bonded to one another by an adhesive.

8. The composite diaphragm according to claim 1, wherein the first layer has a thickness of about 0.050 inches or greater in at least the disc portion and at least part of the perimeter flange portion and wherein the reduced thickness in the area of the flex portion is between about 0.020–0.040 inches.

9. The composite diaphragm according to claim 1, wherein the first layer has a thickness of about 0.050 inches or greater in at least the disc portion and at least part of the perimeter flange portion and wherein the reduced thickness in the area of the flex portion is about 0.030 inches.

10. The composite diaphragm according to claim 1, wherein the first layer of material is a fluorocarbon material.

11. The composite diaphragm according to claim 10, wherein the fluorocarbon material is a polytetrafluoroethylene material.

12. The composite diaphragm according to claim 11, wherein the polytetrafluoroethylene material is TEFLON.

13. The composite diaphragm according to claim 1, further comprising:
   a plurality of openings formed through the perimeter flange for mounting the diaphragm to a pump.

14. The composite diaphragm according to claim 1, further comprising:
   an enlarged cross section V-shaped band formed in the perimeter flange adjacent the outer perimeter for mounting the diaphragm to a pump.

15. The composite diaphragm according to claim 1, further comprising:
   a diaphragm rod opening formed through the center axis of the disc portion.

16. A diaphragm pump having a fluid inlet, a fluid discharge, and at least one diaphragm for pumping a fluid from the inlet to the discharge, the diaphragm comprising:
   a diaphragm body having an outer perimeter, a center axis, and a first and a second exterior surface;
   a perimeter flange portion of the body extending around the body adjacent the outer perimeter;
   a disc portion of the body extending radially outward from the center axis;
   a convoluted flex portion of the body disposed between the perimeter flange portion and the disc portion;
   a chemically resistant first layer of material defining the first exterior surface;
   a flexible second layer of material bonded to the first layer and defining the second exterior surface; and
   wherein the first layer of material has a reduced material thickness in the area of the flex portion of the body.

17. The diaphragm pump according to claim 16, wherein the second layer of material is an elastomer material.

18. The diaphragm pump according to claim 17, wherein the elastomer material is a neoprene rubber.

19. The diaphragm pump according to claim 16, wherein the second layer of material further comprises:
   a fabric reinforcement material embedded therein.

20. The diaphragm pump according to claim 19, wherein the fabric reinforcement material is a nylon fabric.

21. The diaphragm pump according to claim 16, wherein the second layer of material further comprises:
   a fabric reinforcement material; and
   an elastomer material molded around the fabric reinforcement material.

22. The diaphragm pump according to claim 16, wherein the first and second layers of material are permanently bonded to one another by an adhesive.

23. The diaphragm pump according to claim 16, wherein the first layer has a thickness of about 0.050 inches or greater in at least the disc portion and at least part of the perimeter flange portion and wherein the reduced thickness in the area of the flex portion is between about 0.020–0.040 inches.

24. The diaphragm pump according to claim 16, wherein the first layer has a thickness of about 0.050 inches or greater in at least the disc portion and at least part of the perimeter flange portion and wherein the reduced thickness in the area of the flex portion is about 0.030 inches.

25. The diaphragm pump according to claim 16, wherein the first layer of material is a fluorocarbon material.

26. The diaphragm pump according to claim 25, wherein the fluorocarbon material is a polytetrafluoroethylene material.

27. The diaphragm pump according to claim 26, wherein the polytetrafluoroethylene material is TEFLON.

28. A method of fabricating a composite diaphragm for a diaphragm pump, the method comprising the steps of:
   molding a layer of flexible material, the layer having a perimeter flange portion, a center axis, a disc portion extending radially outward from the center axis, and a convoluted flex portion between the perimeter flange portion and the disc portion;
   fabricating a layer of chemically resistant material, the layer having a perimeter flange portion, a center axis, a disc portion extending radially outward from the center axis, and a convoluted flex portion between the perimeter flange portion and the disc portion, wherein the convoluted flex portion has a reduced material thickness in comparison to at least a material thickness of the disc portion and at least part of the perimeter flange portion;
   placing the layer of flexible material and the layer of chemically resistant material adjacent one another so that the respective center axes, convoluted flex portions, and perimeter flange portions align with one another; and
   permanently bonding the layer of flexible material and the layer of chemically resistant material to one another.

29. The method according to claim 28, wherein the step of molding further comprises:
   molding the flexible layer of material from an elastomer material.

30. The method according to claim 28, wherein the step of molding further comprises:
   providing a fabric reinforcement layer and molding the flexible layer over the fabric reinforcement layer.

31. The method according to claim 28, wherein the step of molding further comprises:

provides a nylon fabric reinforcement layer and molding the flexible layer over the nylon fabric reinforcement layer.

32. The method according to claim 28, further comprising the step of:

applying an adhesive to at least one of the flexible and the chemically resistant layers before the step of placing.

33. The method according to claim 28, wherein the step of fabricating further comprises:

fabricating the chemically resistant layer from a fluorocarbon material.

34. The method according to claim 28, wherein the step of fabricating further comprises:

fabricating the chemically resistant material from a polytetrafluoroethylene material.

35. The method according to claim 28, wherein the step of fabricating further comprises:

fabricating the chemically resistant material from TEFLON.

* * * * *